Nov. 14, 1967     E. A. LEMAIRE     3,352,094
NUT HARVESTING APPARATUS
Filed Nov. 27, 1964     3 Sheets-Sheet 2
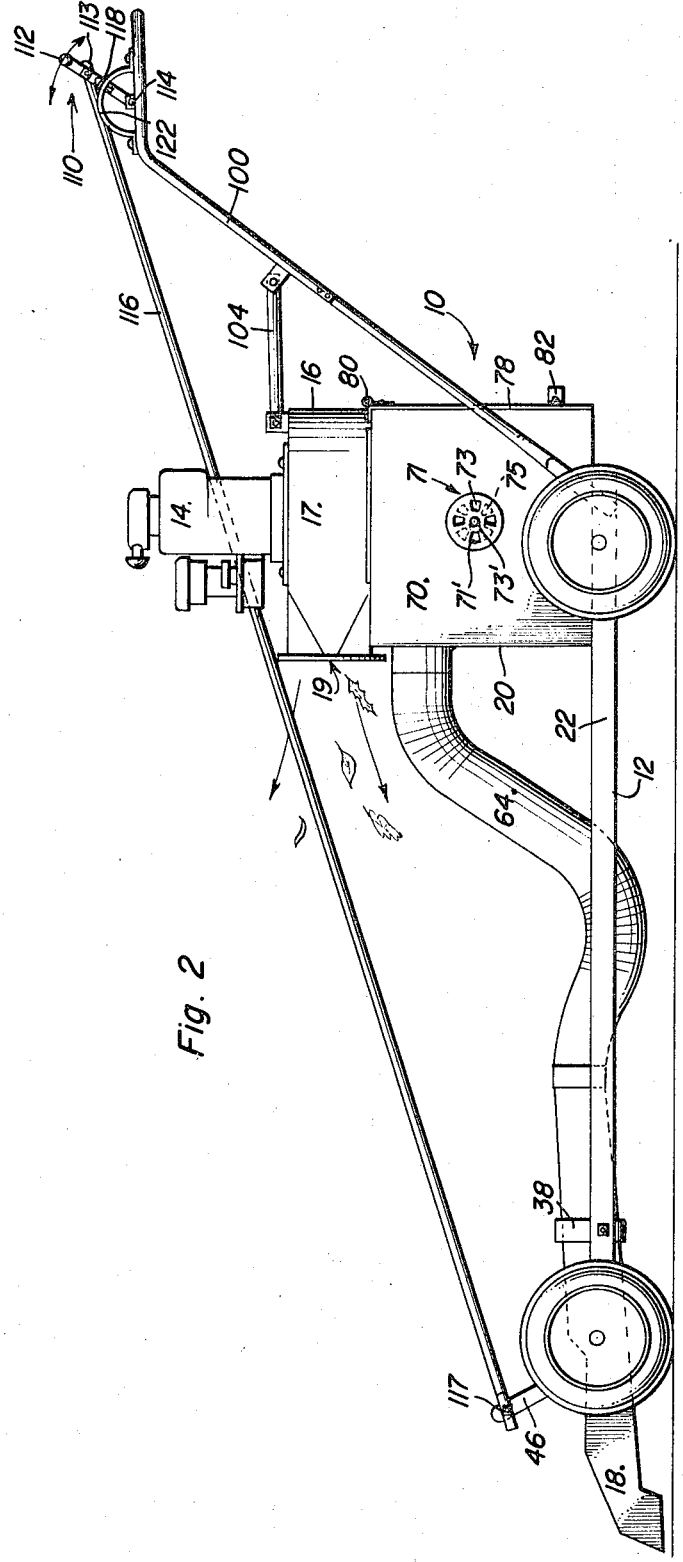
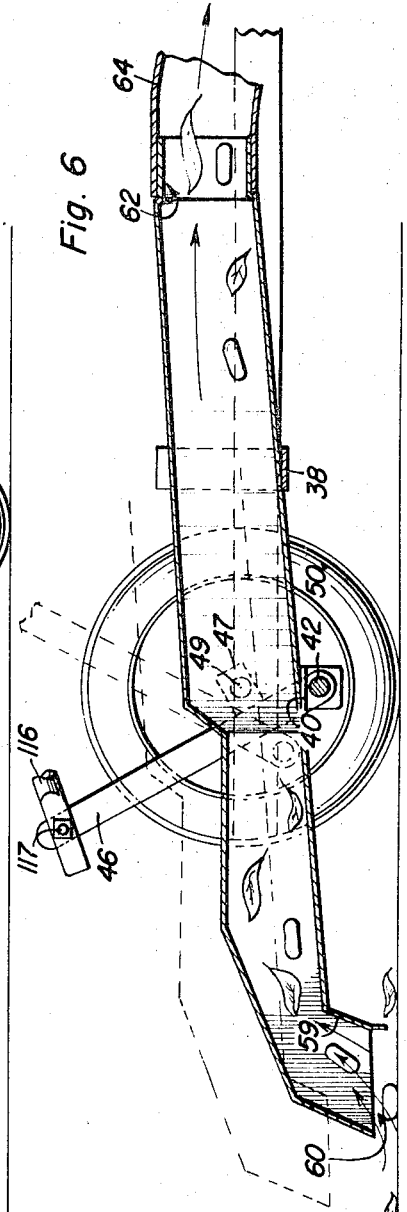
Eugene A. Lemaire
INVENTOR.
BY Clarence A. O'Brien
and Harvey B. Jackson
Attorneys Nov. 14, 1967  E. A. LEMAIRE  3,352,094
NUT HARVESTING APPARATUS
Filed Nov. 27, 1964  3 Sheets-Sheet 3
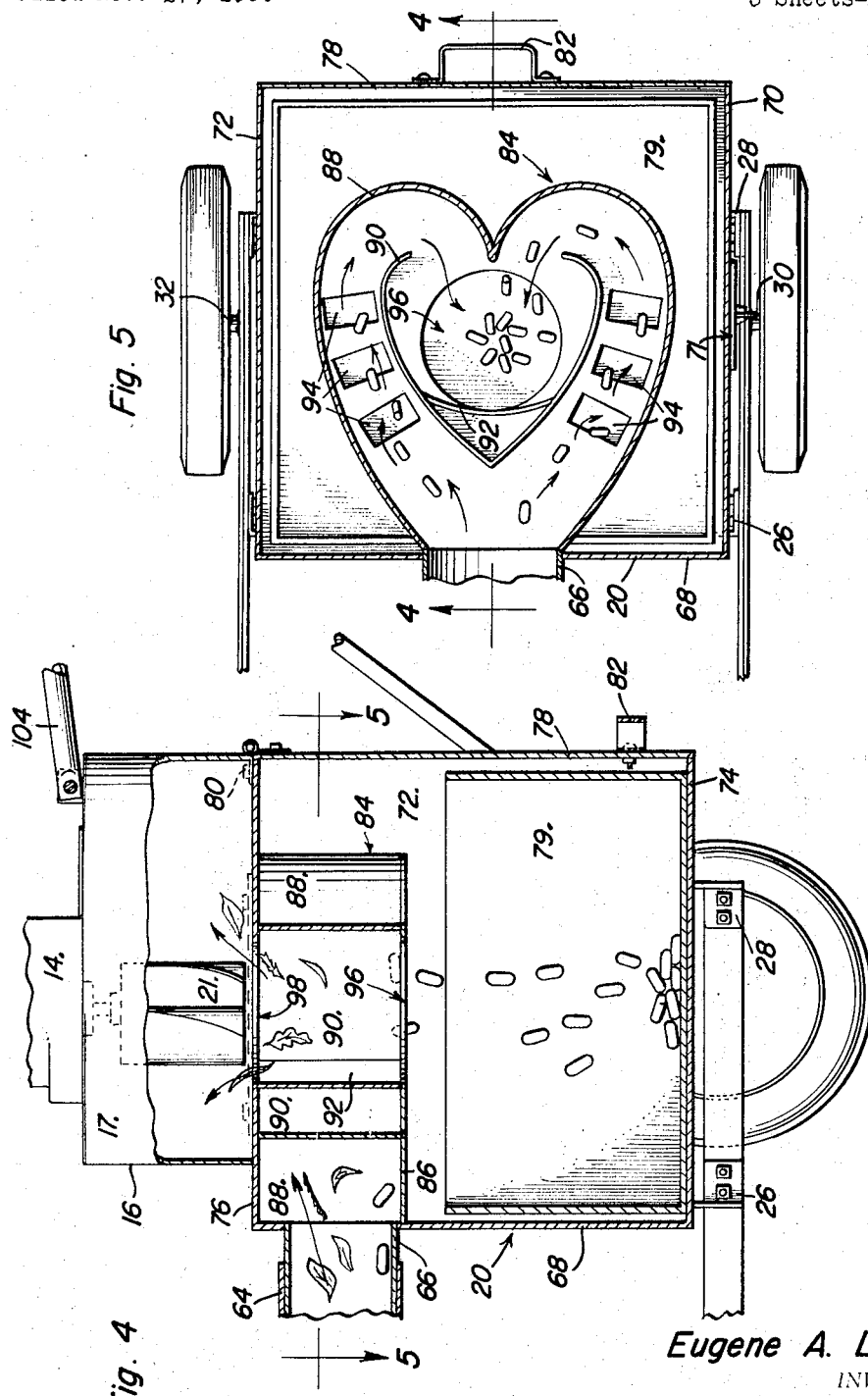
Eugene A. Lemaire
INVENTOR.

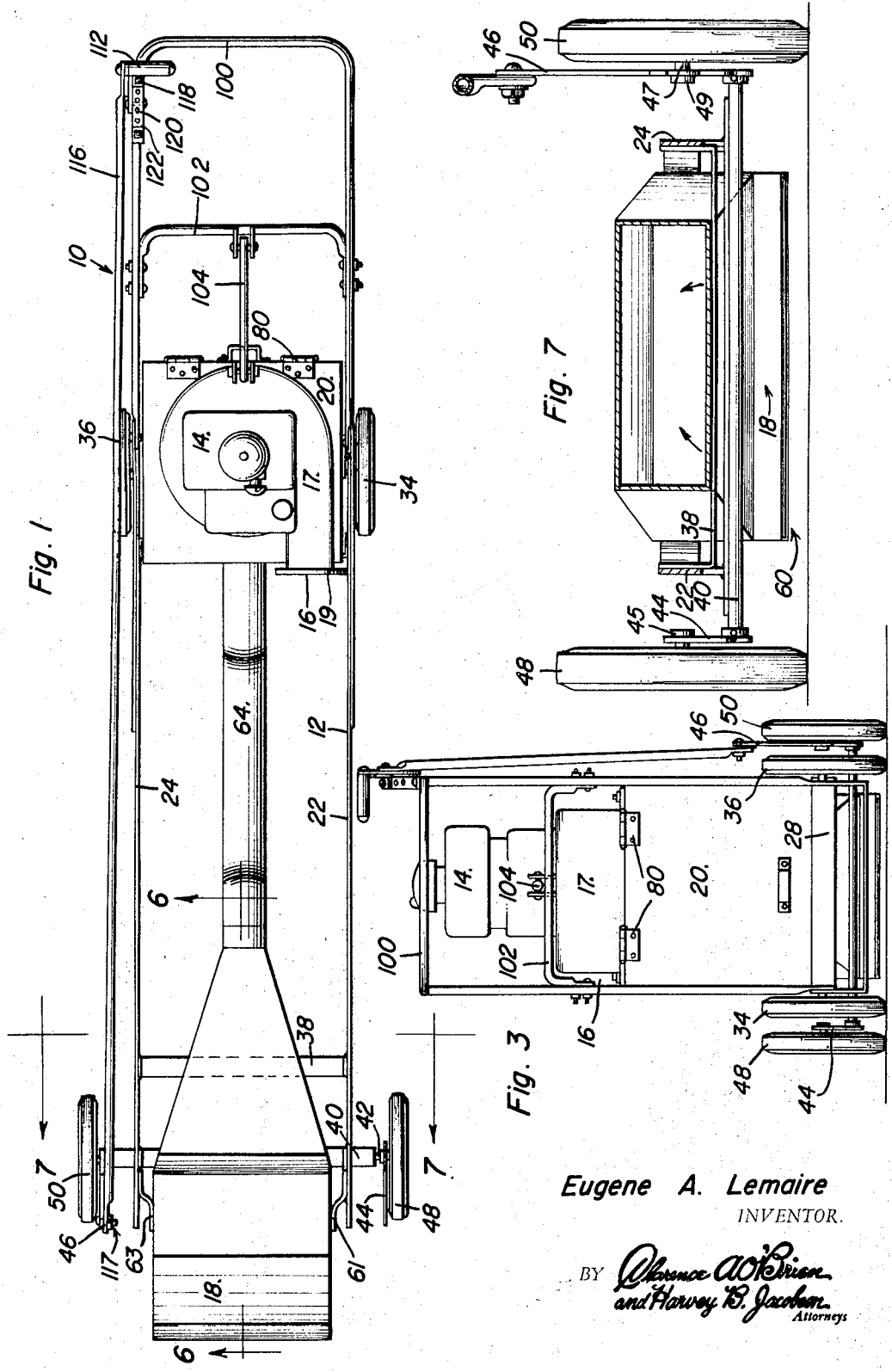

United States Patent Office 3,352,094
Patented Nov. 14, 1967

3,352,094
NUT HARVESTING APPARATUS
Eugene A. Lemaire, 1306 E. Kent Drive,
Sulphur, La. 70663
Filed Nov. 27, 1964, Ser. No. 414,341
11 Claims. (Cl. 56—328)

ABSTRACT OF THE DISCLOSURE

A power operated nut harvesting machine mounted on a mobile chassis and including a suction pickup nozzle adjustably positioned adjacent the supporting surface which suction pickup nozzle is connected to a separator chamber within which harvested nuts are separated from extraneous trash and wherein the trash is withdrawn from the separator chamber by a suction fan intaking air from the pickup nozzle through the separator chamber for discharge of the trash forwardly of the harvesting machine and therein the harvesting machine further includes a separator chamber having means defining diverging and subsequently recombining plenums to facilitate the separation of harvested nuts from extraneous trash.

---

This invention relates generally to a machine for gathering nuts which have fallen to the ground and particularly to a power operated, attendant propelled nut harvester of the type having a suction pickup nozzle.

The power operated nut harvesting machines known in the art are generally rather massive and are therefore not satisfactory for use by growers with relatively small orchards. The presence of low hanging branches on some of the trees in an orchard generally renders a massive harvester ineffective, thus leaving "blind spots" in the orchard that the harvester cannot reach. The fallen nuts in these "blind spots" must then be tediously harvested by hand. Additionally these massive harvesting machines are relatively complex and are accordingly initially expensive and subsequently costly to operate and maintain. The purchase of a harvester of this type is therefore economically unfeasible for a person with a relatively small nut orchard.

The need therefore exists for a relatively compact, portable nut harvester which is simple in design, relatively inexpensive, and effective for the utility intended.

It is therefore a principal object of this invention to provide a novel structure for a nut harvesting machine which is characterized by a simple, compact, construction and which operates to efficiently gather fallen nuts by pneumatic means while effectively separating the nuts from any leaves, twigs, etc., which may be gathered with the nuts.

It is a further object of this invention to provide a nut harvesting machine with a suction pickup nozzle which may be readily manipulated by the attendant to adjust the clearance of the nozzle with respect to the ground while the machine is in motion.

Still another object of this invention is the provision of a nut harvesting machine which has a novel separator baffle structure to insure total separation of the unwanted trash from the nuts harvested.

The nut harvesting machine embodying the present invention generally includes a nut gathering suction nozzle connected by a flexible tube to a separating chamber which includes a baffle chamber to effect the separation of the nuts harvested from the trash gathered with the nuts. The suction required to gather the nuts is developed by a centrifugal fan mounted on top of the separator chamber and powered by an internal combustion engine. The separator chamber is provided with a removable receptacle for the collection of the nuts harvested, while the trash is discharged from the outlet of the centrifugal fan.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the nut harvesting machine of the present invention;
FIGURE 2 is a side elevational view of said machine;
FIGURE 3 is a rear elevational view of said machine;
FIGURE 4 is an enlarged partial side elevational view of said machine with portions broken away and showing a vertical sectional view of a portion of the interior of the machine taken substantially on line 4—4 of FIGURE 5;
FIGURE 5 is a partial horizontal sectional view taken on the line 5—5 of FIGURE 3;
FIGURE 6 is an enlarged partial vertical sectional view taken on the line 6—6 of FIGURE 1; and
FIGURE 7 is an enlarged partial vertical sectional view taken on the line 7—7 of FIGURE 1.

Referring in detail to the drawings in FIGURE 1 a nut harvesting apparatus is indicated generally at 10 and includes a chassis generally indicated at 12, a fan motor 14, a fan housing 16, a suction pickup nozzle generally indicated at 18 and a separator and nut collection chamber generally indicated at 20.

It may be further seen that the chassis 12 includes side rails 22 and 24 which adjacent the rear extremities are secured in spaced apart relationship by chassis cross members 20 and 28 (as best seen in FIGURES 3, 4 and 5), which are secured by suitable means such as bolting or welding, for example. Stub axles 30 and 32 are secured to their respective side rails 22 and 24 by suitable means such as welding, for example. Rear wheels 34 and 36 are rotatably secured to the stub axles 30 and 32 in a conventional manner not shown.

Additional cross members 38 and 40 are secured to the side rails 22 and 24 adjacent the forward end of the chassis 12 by suitable means such as bolting or welding, for example. The cross member 38 is secured within the side rails 22 and 24 and cross member 40 is secured to the lower edge of the side rails 22 and 24, and transversely overhangs the chassis 12 as best seen in FIGURES 1 and 7. A shaft 42 is rotatably secured to the cross member 40 by means not shown for the purpose of pivotally securing the front wheels 48 and 50 to the chassis 12.

As seen best in FIGURES 3 and 7 an upstanding lever 44 is secured to one end of the shaft 42 by welding. A stub axle 45 is secured to lever 44 adjacent the upper end of the lever 44, and the stub axle 45 has a front wheel 48 rotatably secured thereto, by suitable means not shown. The other front wheel 50 is secured to the shaft 42 by means of a bellcrank lever 46, seen best in FIGURES 6 and 7. A bracket 49 is secured by suitable means such as welding, for example, to the lever 46 and functions as a support means for a stub axle 49 which is secured thereto. The front wheel 50 is rotatably secured to the stub axle 49 by conventional means, not shown. The lever 46 terminates in an upstanding portion which cooperates in a manner, which will be described later, to effectively vary the relative distance between the lower front end of the chassis 12 and the ground, for reasons which will become clear.

The suction pickup nozzle 18 is of a generally rectangular tubular cross section and includes top, bottom and side walls formed of sheet metal. The forward end of the top, bottom, and side walls of the nozzle 18 terminate in a down-turned portion 59, which defines a substantially rectangular suction inlet opening 60. The rear portion of the pickup nozzle 18 terminates in a nozzle outlet 62 of reduced cross sectional area to facilitate connection of the suction pickup nozzle 18 to a source of reduced pressure.

The suction pickup nozzle 18 is secured to the chassis 12 by means of a pair of forward mounting brackets 61 and 63 which are welded or bolted to both the suction pickup nozzle 18 and the side rails 22 and 24. The suction pickup nozzle 18 rests upon and is also secured by welding, for example, to the cross braces 38 and 40. It is therefore seen that the suction pickup nozzle 18 is integral with the chassis 12. A length of flexible, reinforced suction pipe 64 is secured to the outlet 62 by means of a band clamp for example. The opposite end of the suction pipe 64 is secured by means of a band clamp for example, to a nipple 66 which is integral with the separator chamber 20.

As seen best in FIGURES 4 and 5 the separator chamber 20 includes a front wall 68, side walls 70 and 72, a bottom wall 74 a top wall 76 and a rear closure 78 secured to the top 76 by means of hinges 80 which enable the closure 78 to open about a transverse horizontal axis. The closure 78 has a handle secured thereto, and may also be provided with a closure latching means, not shown. The upper portion of the separator chamber 20 has a baffle chamber generally indicated at 84 which includes a plurality of baffles which cooperate to form a means of separating the relatively heavy nuts from relatively light leaves, twigs, etc. which are picked up with the nuts. The baffle chamber 84 includes a bottom 86, a substantially heart shaped exterior baffle wall 88 secured to the bottom 86 and a substantially heart shaped interior-baffle wall 90 which is secured to the bottom 86 in substantially concentric relationship to the exterior baffle wall 88. The interior baffle wall 90 is provided with a gusset 92 for reasons which will become apparent.

The primary function of the baffle chamber 84 is to effect the separation of the relatively heavy nuts from the leaves, twigs, etc. To this end the baffle chamber 84, which we will see is connected to a source of reduced pressure 16, is provided with a plurality of rectangular openings 94 in the bottom 86. The openings 94 are located in the divided plenum formed by the exterior and interior baffles 88 and 90.

A relatively large opening 96 is also provided in the bottom 86. The opening 96 is centrally positioned with regard to the interior of the inner baffle 90, with the forward edge of the opening 96 in alignment with the gusset 92. The baffle chamber 84 is secured to the underside of the top wall of the separator box 20 by welding or bolting, for example.

The baffle box 84 is connected by means of an opening 98 in the top 76 to a source of reduced pressure or suction produced by a suction fan 16 which includes a centrifugal fan housing 17 with an outlet 19 (see best in FIGURES 1 and 2) and an impeller 21 which is secured to the output shaft of a suitable power source such as an internal combustion engine, for example, such as generally indicated at 14.

As best seen in FIGURES 1, 2 and 3 a U-shaped handle 100 is provided for manipulating the nut harvester 10. The handle may be formed of tubular metal and is secured to the outside of the side rails 22 and 24 adjacent the rear end of the chassis 12. The handle 100 is braced by the addition of a tubular cross brace 102. An additional brace 104 is also provided to secure the handle assembly to the nut harvester.

The handle assembly also includes conventional control lines (not shown) for the engine 14.

A pickup nozzle control means generally indicated at 110 is provided to operate the bellcrank 46 to vary the effective distance between the pickup nozzle 18 and the ground. A control lever 112 is pivotally secured to the handle 100 by suitable pivot means at point 114. The control lever 112 is operatively connected to the bellcrank 46 by an operating link 116 which is pivotally secured to lever 112 at point 113 and pivotally secured to bellcrank 46 at point 117. The control handle 112 may be moved in the directions shown by the arrows in FIGURE 2 to cause the bellcrank 46 to pivot the wheels in an arc about the shaft 42 to vary the distance between the lower forward end of the chassis and the ground, therefore effectively varying the distance between the opening 60 of the suction nozzle 18 and the ground. The control lever 112 may be releasably secured in a desired position by means of a pin detent 118 which is carried by the control lever 112. The pin detent 118 may be selectively engaged in any one of the apertures 120 in the curved latch bar 122. A suitable damper 71 may be provided in the sidewall 70 of the separator chamber 20 to admit additional air into the separator chamber 20 to aid in the removal of the lighter trash. The damper 71 is preferably of the rotary type, as shown, although it may be of a type which is slideable, for example. Rotation of the damper 71 to align the openings 73 and 75 will admit air to the separator chamber 20 thus increasing the updraft through the opening 96 to aid in carrying the lighter trash up through opening 98 and out through the fan outlet 19. The rotary damper 71 is secured to the sidewall 70 by means of a threaded bolt 71' which is secured to and projects outwardly from the sidewall 70. The rotary damper 71 may be selectively secured in an open or closed position by a wing nut 73' on the bolt 71'.

In operation the closure 78 is opened and a collection receptacle 79 such as a cardboard box, for example, seen best in FIGURES 4 and 5, is placed in the bottom of the separator chamber 20. The lid 78 is closed and the engine 14 is started.

The operation of the centrifugal fan 16 powered by the motor 14 establishes a pressure differential between the inlet 60 of the suction nozzle 18 and the discharge 19 of the fan 16.

The operator then propels the nut harvester over the area from which it is desired to harvest the fallen nuts. By manipulation of the control handle 112 the operator urges the pickup nozzle 59 from the broken line position to the full line position as shown in FIGURE 6. Moving the nozzle 59 into close proximity with the ground will provide the maximum suction pickup. The nozzle may therefore be adjusted to pick up the nuts without picking up any objects which are materially heavier than the nuts.

As seen best in FIGURES 2, 4, 5 and 6 the nuts are carried along by the air current up into the nozzle 18 along with relatively lighter trash such as leaves, twigs, etc. The nuts and trash are carried along through pipe 64 and up into the baffle box 84. As seen best in FIGURE 5 the air flow is split up into two flow paths by the baffle wall 90 and the relatively heavy nuts are carried along the bottom plate 86 where a number of them drop through the rectangular openings 94 under the influence of gravity and into the collection receptacle 79 positioned in the bottom of the separator chamber 20. The nuts not separated out by the openings 94 continue around under the influence of the air flow to the rear of the baffle chamber where the air flow recombines and drop under the influence of gravity into the collection receptacle 79 through the large circular opening 96 in the bottom 86 of the baffle chamber 84.

The relatively lighter trash is carried up into the fan housing 17 through the opening 98 in the top of the separator chamber 20. As seen best in FIGURE 2 the trash is discharged from the nut harvester through the fan outlet 19. The rotary damper 71 may be rotated to a partially or fully open position to increase the updraft through opening 96 to aid in discharging the lighter trash through the fan outlet 19.

It may therefore be seen that I have invented a nut harvester which is simple, and compact and highly efficient for the utility intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated nut harvesting machine comprising an elongated ground-supported mobile chassis, a suction pickup means mounted on said chassis, said suction pickup means including a suction pickup nozzle adjacent one end of said chassis, a suction pipe forming a conduit from said suction nozzle rearwardly to a separator and nut collector chamber secured adjacent the other end of said chassis, said separator and nut collector chamber being subjected to a motor operated source of suction mounted thereon, said source of suction operatively connected to draw nuts and incidental trash from the ground up into said suction nozzle, through said suction pipe, into said separator and nut collector chamber where the nuts are separated from the incidental trash, the trash being discharged with the air being discharged from said source of suction, said separator and nut collector chamber including a baffle chamber communicating with said pickup nozzle, said baffle chamber having a bottom wall, a first exterior baffle within said baffle chamber defining a generally cordate chamber, a second generally cordate interior baffle generally concentrically disposed with said first baffle, said first and second baffle cooperating to form two diverging plenums, said two plenums recombining into a single plenum which terminates within said second cordate baffle, said baffle chamber bottom wall within said second baffle being apertured to define a discharge opening to permit nuts to drop out of the baffle chamber into a collection receptacle removably positioned in said separator and nut collector chamber beneath said baffle chamber, an opening in the top of said separator and nut collector chamber connecting said baffle chamber to said source of suction thereby permitting the trash picked up with the nuts to be drawn into said source of suction, and said source of suction being provided with an outlet means through which separated trash is discharged from the nut harvester.

2. A power operated apparatus for harvesting nuts comprising an elongated ground supported mobile chassis, said chassis supporting a downwardly and forwardly positioned suction pickup nozzle adjacent the ground, means connecting said pickup nozzle to a source of suction, said suction means comprising a centrifugal fan supported by said chassis, a separator and nut collector chamber means intermediate of said suction pickup nozzle and said source of suction to separate and collect the nuts being harvested from the trash also picked up by said suction nozzle, the trash being carried along by the airflow and discharged with the air discharging from said centrifugal fan, a handle supported by said chassis and extending upwardly and rearwardly therefrom, said handle being used by the attendant to guide said nut harvester and a control means operatively secured to said handle, said control means being operatively connected to a means for varying the distance of said suction pickup nozzle from the ground, said means intermediate of said suction pickup nozzle and said source of suction to separate and collect the nuts being harvested from the trash also picked up including a baffle chamber communicating with said pickup nozzle, said baffle chamber having a bottom wall, a first exterior baffle within said baffle chamber defining a generally cordate chamber, a second generally cordate interior baffle generally concentrically disposed within said first baffle, said first and said second baffles cooperating to form two diverging plenums, said two plenums recombining into a single plenum which terminates within said second cordate baffle, said baffle chamber bottom wall within said second baffle being apertured to define a discharge opening to permit nuts to drop out of the baffle chamber into a collection receptacle in said separator and nut collector chamber beneath said baffle chamber, and opening in the top of said separator and nut collector chamber to said centrifugal fan thereby permitting the trash picked up with the nuts to be drawn into said centrifugal fan and said centrifugal fan being provided with an outlet means through which separated trash is discharged from the nut harvester.

3. The structure of claim 2 including an elongated ground supported chassis including a pair of transversely aligned front wheels, said wheels being pivotally secured to said chassis for movement about a horizontal axis transverse to said chassis, means operatively connected to said pivotally secured wheels to enable the attendant to selectively position said wheels to vary the distance between said chassis and the ground.

4. A power operated attendant propelled apparatus for harvesting nuts comprising an elongated, ground supported mobile chassis, said chassis supporting a downwardly and forwardly positioned suction nozzle, means connecting said pickup nozzle to a source of suction, a separator chamber rearwardly positioned on said chassis and secured to said chassis, said separator chamber being positioned intermediate of said pickup nozzle and said source of suction, said separator chamber including means connected to said nozzle and said suction means to separate the nuts being harvested from the trash picked up with the nuts, said separator means including a baffle chamber communicating with said pickup nozzle, said baffle chamber having a bottom wall, a first generally heart-shaped exterior baffle, a second generally heart-shaped interior baffle concentrically disposed within said first heart shaped baffle, said first and said second baffles supported between said baffle bottom and the top of said separator and cooperating to form two diverging plenums, a plurality of first openings defined in the bottom of said baffle chamber to permit nuts to drop through, said two plenums recombining into a single plenum which terminates within said second heart shaped baffle, said baffle bottom within said second heart-shaped baffle being cut out to define an opening to permit any nuts not separated out by said first openings to drop out of the baffle chamber into a collection receptacle removably positioned in said separator chamber beneath said baffle chamber, an opening in the top of said separator chamber connecting said baffle chamber to said source of suction thereby permitting the trash picked up with the nuts to be drawn into said suction fan to be discharged with the air discharged from said suction fan, and a rearwardly and upwardly extending handle secured to said chassis, said handle being utilized by the attendant to manipulate the apparatus.

5. The structure of claim 4 wherein said elongated chassis includes a pair of transversely aligned front wheels, said wheels being pivotally secured to said chassis for movement about a horizontal axis transverse to said chassis, means operatively connected to said pivotally secured wheels to enable the attendant to selectively position said wheels to vary the distance between said chassis and the ground.

6. The structure of claim 4 wherein said separator chamber is provided with an air inlet means said air inlet means including an adjustable damper.

7. The combination of claim 1 wherein said source of suction outlet means is directed forwardly of said nut harvesting machine.

8. The combination of claim 2 wherein said centrifugal fan outlet means is directed forwardly of said apparatus for harvesting nuts.

9. A power operated apparatus for harvesting nuts comprising an elongated ground supported mobile chassis, said chassis supporting a downwardly and forwardly positioned suction nozzle, means connecting said pickup nozzle to a source of suction, a separator chamber rearwardly positioned on said chassis and secured to said chassis, said separator chamber being positioned intermediate of said nozzle and said source of suction, said separator chamber including means connected to said nozzle and said suction means to separate the nuts being harvested from the trash picked up with the nuts, said separator means including a baffle chamber communicating with said pickup nozzle, said baffle chamber having a bottom wall, a first generally cordate exterior baffle, a second generally cordate interior baffle concentrically disposed within said first cordate baffle, said first and said second baffle supported between said baffle bottom wall and the top of said separator and cooperating to form two diverging plenums, said two plenums recombining into a single plenum which terminates within said second cordate baffle, said baffle bottom wall within said second cordate baffle being apertured to permit nuts to drop out of the baffle chamber to a collection receptacle in said separator chamber beneath said baffle chamber and an opening in the top of said separator chamber connecting said baffle chamber to said source of suction thereby permitting the trash picked up with the nuts to be drawn into said suction fan to be discharged with the air discharged from said suction fan.

10. The structure of claim 9 wherein said elongated chassis includes a pair of transversely aligned front wheels, said wheels being pivotally secured to said chassis for movement about a horizontal axis transverse to said chassis, means operatively connected to said pivotally secured wheels to enable the attendant to selectively position said wheels to vary the distance between said chassis and the ground.

11. The structure of claim 9 wherein said separator chamber is provided with an air inlet means said air inlet means including an adjustable damper.

References Cited
UNITED STATES PATENTS

| | | | |
|---|---|---|---|
| 1,558,924 | 10/1925 | Riggs | 56—328 |
| 2,502,810 | 4/1950 | Waters. | |
| 2,593,625 | 4/1952 | Stokes | 56—328 |
| 2,658,227 | 11/1953 | White | 15—361 |

ABRAHAM G. STONE, *Primary Examiner.*

P. RAZZANO, *Assistant Examiner.*